United States Patent [19]

Bonsall et al.

[11] Patent Number: 5,491,798
[45] Date of Patent: Feb. 13, 1996

[54] METHOD FOR NETWORK CALL MANAGEMENT

[75] Inventors: Gordon W. Bonsall, Littleton; Howard S. Lambert, Hedge End; H. David Mitchell, Richmond Upon Thames; Barry K. Aldred, Malmesbury Gardens, all of United Kingdom

[73] Assignee: International Business Machines Corporation, Armonk, N.Y.

[21] Appl. No.: 150,675

[22] Filed: Nov. 10, 1993

[30] Foreign Application Priority Data

Sep. 25, 1993 [GB] United Kingdom .................. 9319851

[51] Int. Cl.$^6$ ................................................ G06F 15/177
[52] U.S. Cl. ............... 395/200.04; 379/202; 364/DIG. 1
[58] Field of Search ....................... 395/200.04; 379/202, 379/204

[56] References Cited

U.S. PATENT DOCUMENTS

| | | | |
|---|---|---|---|
| 4,544,804 | 10/1985 | Herr et al. ................................ | 379/204 |
| 4,555,781 | 11/1985 | Baldry et al. .............................. | 320/60 |
| 4,754,478 | 6/1988 | Leibersberger et al. .................. | 379/204 |
| 4,811,334 | 3/1989 | Matt ........................................ | 379/229 |

OTHER PUBLICATIONS

Aldred et al., "An Application Programming Interface for Collaborative Working", *Fourth IEE Conference on Telecommunications*, IEEE, London, Apr. 18–21, 1993, pp. 146–151.

Conti et al., "Requirements for a Multiparty Data Communication Protocol", *1992 International Zurich Seminar on Digital Communications*, IEEE, Mar. 16–19, 1992, pp. E6/1–8.

*Primary Examiner*—William M. Treat
*Attorney, Agent, or Firm*—Stephen T. Keohane

[57] ABSTRACT

A network comprises a set of nodes, each comprising a computer workstation in a computer network and including means responsive to messages from other computers in the network to join or leave a call. Each node maintains a list of calls in which that node is participating, an entry in the list for a call including the identities of all the other nodes in that call. In order to split a single call one node sends messages to a subset of nodes to join a second call, and leave the original call. The remaining parties in the original call then continue in a call of reduced scope. In order to merge two calls together, a node that is common to both calls sends messages to all the nodes in both calls, instructing them to leave the existing call and join a new call.

17 Claims, 3 Drawing Sheets

METHOD FOR NETWORK CALL MANAGEMENT

FIELD OF THE INVENTION

The present invention relates to the management of calls over a computer network, and in particular the merging and splitting of such calls.

BACKGROUND OF THE INVENTION

Telephone conference calls are well-known in the art. Such calls are arranged so that a new party can be added to the conference by an existing person dialing out, and any of the existing parties can leave by hanging up. Some systems allow a new party to dial in to a call, but do not allow two existing multi-way calls to be merged into one, nor allow a single existing multi-way call to be split into two. These restrictions are partly due to the nature of existing PSTN equipment, and in particular the very limited degree of control information that can be exchanged with a conventional telephone. Furthermore merging and splitting have to be very carefully coordinated across the various nodes if they are to be successful.

More recently, multi-media conferencing facilities have been developed, which provide both video and voice connections (see, e.g. "Distributed Multiparty Desktop Conferencing System: MERMAID", by K. Watabe, S. Sakata, K. Maeno, H. Fukuoka, T. Ohmori, in "CSCW '90: Proceedings of the Conference on Computer-Supported Cooperative Work", 1990). A CCITT proposal (part of the T.12x draft standards) for a Multi-media Control Unit to handle multi-media conferencing imposes many of the same restrictions as currently exist for telephone conferences. This is partly due to the adoption of a relatively fixed, hierarchical structure, which centralizes control at a single node. A need exists for a call management system which does not suffer from such limitations.

SUMMARY OF THE INVENTION

Accordingly, the invention provides a method of splitting an initial call that exists across an initial set of nodes into first and second calls across two disjoint subsets of the initial set, each node comprising a computer workstation in a computer network and including means responsive to messages from other computers in the network to join or leave a call, and each node maintaining a list of calls in which that node is participating, an entry in the list for a call including the identities of all the other nodes in that call, the method comprising the steps of:

producing at one node in said initial set a list of the subset of nodes to be included in said first call, whereby the second call is to be between nodes in the initial set but not in said subset;

said one node sending a message to each node in said subset of nodes including instructions to leave said initial call and join said first call;

each node upon receipt of said message performing the necessary actions to leave the initial call and join the first call.

Effectively the call is divided into two groups by splitting off a subset into a new call, with the remnant of the original call becoming the second group. Note that in this context "network" refers to a logical grouping of computer workstations, which may be represented by one or more physical networks. In other words, the network may extend across (parts of) one or more LANs, linked for example by an ISDN connection.

In a preferred embodiment, each call has a name, and no node may participate in two calls laving the same name, and the method further comprises the steps of producing at said one node a name for said first call, and including the name for said first call in the message sent to each node of said subset. Preferably the name of the initial call is included in the message sent to each node in said subset. In some circumstances it may be possible that not all the nodes that split off into the new group correctly interpret the instructions as also requiring them to leave the original call. However, the practical effects of this are likely to be minimal since the newly split off group at least will contain only the correct participants.

It is also advantageous if, as each node of said subset receives said message from said one node, it sends back a confirmation message to said one node, which then forwards the message to the other nodes that have so far joined said subset. This exchange of messages allows each node to update its record of the current particants in each call, thereby ensuring that future actions (e.g. such as further splitting) can be accomplished correctly.

The invention also provides a method of merging first and second calls that exist across first and second initial sets of nodes into a single call across a superset of said first and second initial sets, each node comprising a computer workstation in a computer network and including means responsive to messages from other computers in the network to join or leave a call, and each node maintaining a list of calls in which that node is participating, an entry in the list for a call including the identities of all the other nodes in that call, the method comprising the steps of:

one node sending a message to each node in said first initial set of nodes including instructions to leave said first call and join said single call;

said one node sending a message to each node in said second initial set of nodes including instructions to leave said second call and join said single call;

each node upon receipt of said message performing the necessary actions to leave the first or second initial call as appropriate and join the single call.

Merging is therefore achieved by setting up a completely new call containing all the participants of the two original calls. An alternative strategy would be to invite all those nodes in, for example, the second call to join the first call. However, this can be disadvantageous in some special circumstances, in that the lack of symmetry may result in some inequality between old and new members of the call (this may surface, for example, in resource allocation in a token passing environment).

In a preferred embodiment, each call has a name, and no node may participate in two calls having the same name, and the method further comprises the steps of producing at said one node a name for said single call, and including the name for said single call in the messages sent to each node in said first and second sets. Preferably the name of the first call is included in the message sent to each node in said first set, and the name of the second call is included in the message sent to each node in said second set. Again, in some cases it may be that a node does not recognize that not only must it join the new, unified call, but that it must also leave its original call. In practice however, this is of little importance, since the original calls become defunct or dormant. The only disadvantage of not withdrawing from the original call is therefore the existence of (relatively small) continued overheads associated with maintaining these original calls.

Sometimes an initial step will be performed, which involves selecting said one node, and if the selected node is not already included in both the first and second calls, adding said one node to the first or second call as appropriate. This process ensures that the one node is inside both calls before it attempts to control their merger, rendering the performance of future actions simpler.

BRIEF DESCRIPTION OF THE DRAWINGS

An embodiment of the invention will now be described by way of example, with reference to the following drawings.

DETAILED DESCRIPTION OF THE PREFERRED EMBODIMENT

Figure 1:
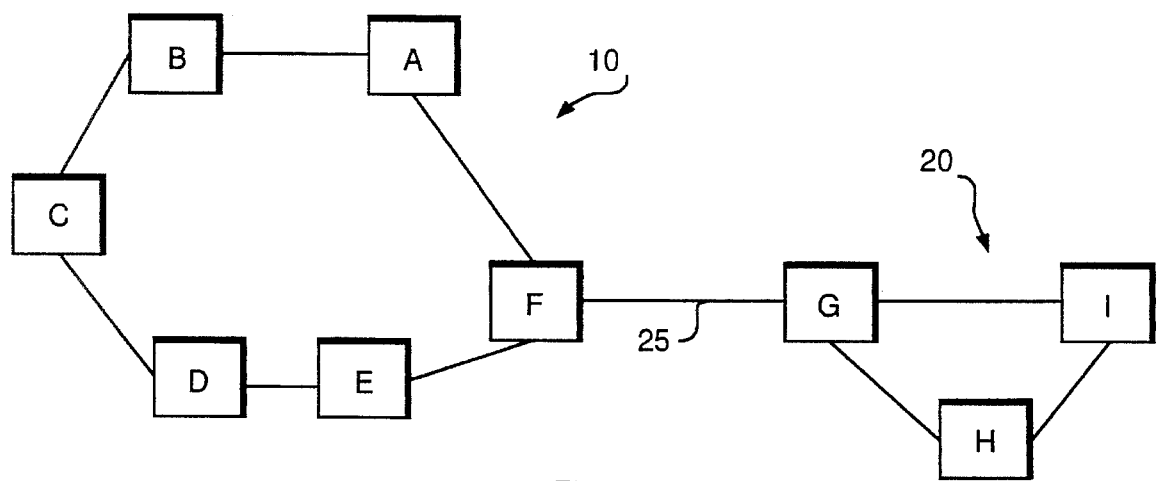
FIG. 1 is a simple diagram of a computer network.

FIG. 1 shows a network of computers connected by a variety of links: for example nodes A–F are part of a first LAN 10, nodes G–I are part of a second LAN 20, with nodes F and G being connected by an ISDN link 25. Messages can be exchanged between these computers over the LAN or ISDN connections in accordance with appropriate protocols. At this level the arrangement of FIG. 1 is completely conventional: the communications protocols are well-known in the art and are typically the subject of international CCITT or IEEE standards, so that they will not be described further.

Figure 2:
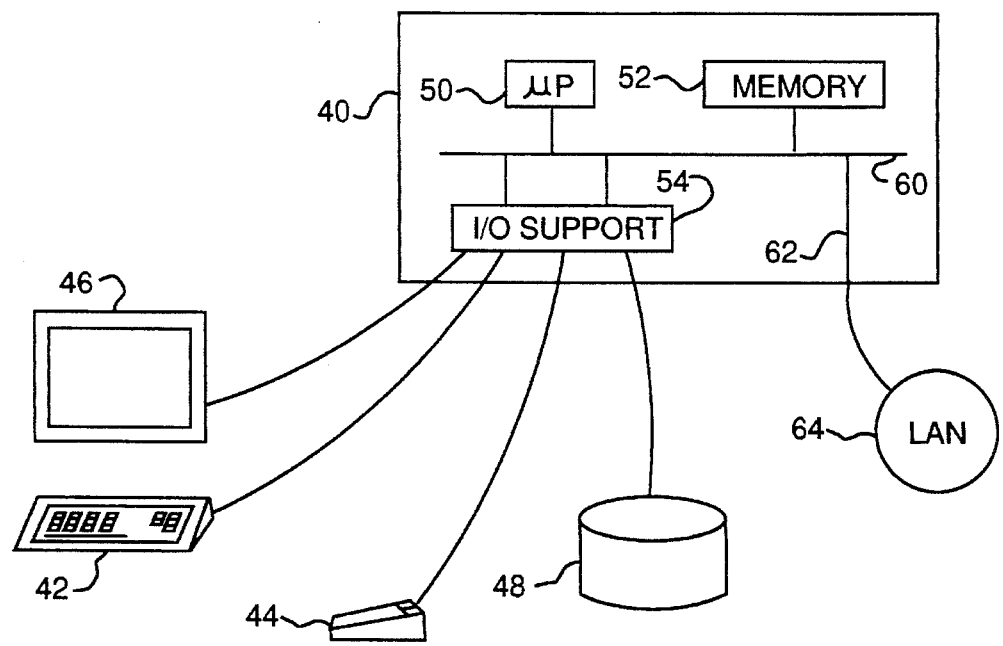
FIG. 2 is a schematic diagram depicting the main components of a typical computer workstation forming a node in the network of FIG. 1.

A highly simplified schematic diagram of a conventional computer workstation is shown in FIG. 2, such as may form a typical node in the network of FIG. 1. The workstation includes a system unit 40, keyboard 42 and mouse 44 for input, a computer screen for display 46, and a hard disk drive 48 for data storage. The system unit includes a bus 60 to which is connected the central microprocessor 50 which controls the workstation, semi-conductor memory (ROM/RAM) 52, and I/O support devices 54 for the keyboard, display, etc. Also included in the system unit is an adapter card 62 containing appropriate hardware and software to allow the workstation to be attached to a LAN 64. The computer workstation of FIG. 2 may be further equipped with other devices (not shown), such as a microphone or video camera to allow sound and/or video input. Typically such extra devices will have their own adapter cards. The computer workstation may also include additional adapter cards (not shown) to support other modes of communication, such as ISDN. The computer workstation of FIG. 2 may for example be an IBM® PS/2® computer fitted with a Token Ring adapter card (also available from IBM).

Figure 3:
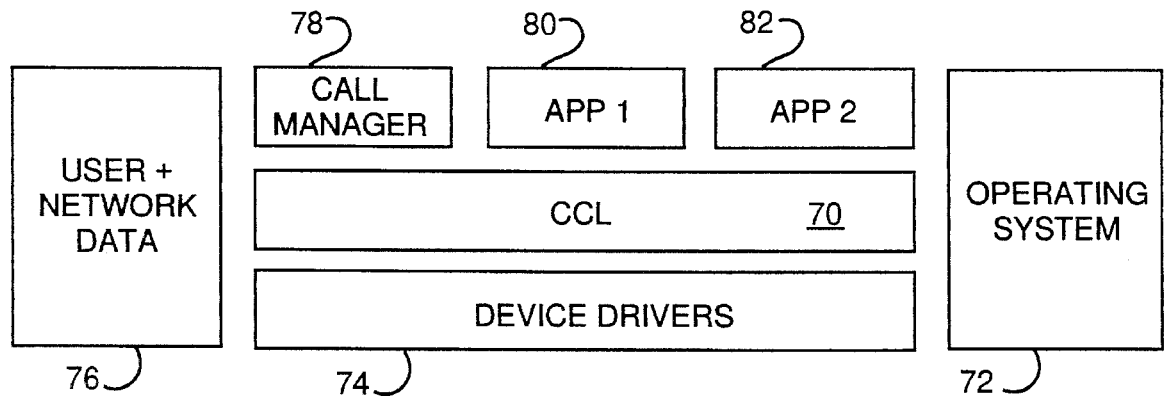
FIG. 3 illustrates the main software components running on the computer workstation of FIG. 2.

FIG. 3 shows more detail of the software components running in the workstation of FIG. 2. The central component is a communications control layer (CCL) 70 which is responsible for managing at a logical level the connections and data flow across the network. Below the CCL are the device drivers 74, which are pieces of code used to directly control hardware attachments, such as displays or communications adapters, plus other associated code. Each adapter card or I/O device has its own device driver. When the CCL wishes to send a message to another node in the network, it passes the message together with appropriate information (including the target node) to the device driver associated with the communication adapter card for the selected link (ISDN, LAN or whatever). Device drivers and message transmission protocols are very well-known in the art, and so will not be described further.

The CCL also has access to operating system services 72 and, via suitable bridge code (not shown), to various data files 76, which can be used for example to store detailed addresses of network users, and various operating system services. Also depicted in FIG. 3 are the applications 78, 80, 82, which are responsible for providing the required functions for the user (typical applications might represent video conferencing, electronic mail, collaborative working, and so on). Modern applications utilize operating system services to provide a graphical user interface (GUI), whereby the user moves a mouse to locate a cursor on the screen over an icon or menu item representing the desired selection, and then clicks on the mouse to activate that selection.

One particularly important application shown in FIG. 3 is the Call Manager 78, which plays a central role in initiating and controlling calls to and from other nodes in the network. The CCL will recognize only one Call Manager at a node at any given time. It is possible for the user to select another application to perform the functions of the Call Manager, in which case the CCL must be informed accordingly.

The Call Manager interacts with the CCL to commence a call to another node, normally as a result of direct user control of the Call Manager, although sometimes an application may pass an appropriate request to the Call Manager to set up a call on its behalf. It is possible for an application to interact directly with the CCL to instigate a call, but in this case the CCL first notifies the Call Manager of the request. Typically the Call Manager would then obtain confirmation from the user of the intended communication in order to prevent unwanted applications such as viruses from propagating over the network. The Call Manager is also notified of all incoming calls to a node, and is responsible for deciding whether or not to accept such a call (normally it will ask the user to make this decision). Further aspects of Call Manager operation are explained in more detail below.

With regards to actual communications between the Call Manager (or any other application) and the CCL, the latter has a set of function calls which can be invoked by the Call Manager when required. In order for the CCL to initiate the flow of information in the reverse direction (i.e. back to an application), such as to notify the Call Manager that a call has arrived, a call-back function is supplied by each application interacting with the CCL. A call-back function is a standard programming technique which provides the address of a routine in the calling application. The CCL effectively calls this function to write a message from the CCL to the application into a particular memory area belonging to the application.

From the perspective of time user, communications with other machines (or possibly between two applications running on the same machine) are represented by calls between applications. However, at the CCL, everything is handled via two related calls, "share" and "unshare", which are used to add or remove applications from a "sharing set". These calls are passed from an application such as the Call Manager to the CCL. The syntax of these two calls is:

share_app(X, A, Y, B, N, U)

unshare_app(X, A, N, U)

where X and Y are nodes, A and B are applications running on nodes X and Y respectively, N is the name of a sharing set of applications to which A already belongs, and U represents user information that may be utilized for a variety of purposes (other parameters not necessary to an understanding of the present invention may also be included). Note that Y may be identical to X, in which case the two applications are running on the same machine.

The share command can be issued by an application other than A, for example by the Call Manager at node X, or even from another machine. Likewise, the unshare command may also be issued by an application other than A, although in this case, only from another application on the same machine. For the share command, application B will generally be specified by name, in which case assuming that the call is to be accepted, the Call Manager at node Y will either complete the share with an existing instance of application B at node Y, or launch a new version of that application. If N (identifying the sharing set) is NULL for the share command, then B is being asked to select which of B's sharing sets A can join. If N is null for the unshare command, then application A is removed from all its sharing sets.

The process of setting up a simple two-way call will now be described. As mentioned above, the user may initiate such a call either from the Call Manager, or from another application. In the latter case, the application may pass the share command directly to the CCL itself, or may go through the Call Manager. In order to start such a call, the user is typically presented with a directory of names and a class of service. The class of service represents the type of communication that will be performed, e.g. video, data transfer, and voice, and allows the CCL to ensure that the desired communication will be physically possible (e.g. that sufficient bandwidth can be obtained). The class of service effectively represents a further parameter to the share command in addition to those listed above. Typically the name will be some alias or other shortened form of address; in such a case, the full address can be accessed from stored data files, which may or may not be maintained at that particular node.

Once the user has selected the person to communicate with and the necessary class of service, a share command is issued to the CCL with the following structure:

share(X, NULL, Y, NULL, "callid1", NULL)

where "NULL" is taken as referring to the Call Manager. Thus this call establishes a sharing set, named as "callid1", between the Call Manager at node X and the Call Manager at node Y. Under the current protocol, when two applications wish to share, the normal procedure is to form a sharing set including the two Call Managers from the respective nodes, which effectively controls communications between the two nodes (this is not necessary if the two Call Managers are already in a suitable sharing set). The applications then establish a parallel sharing set between themselves. The name of the node Y represents the identity of the person to be called. Note that "callid1" must be chosen to avoid any ambiguity. One relatively straightforward way of achieving this is to combine the node name (X in this case), which is guaranteed to be globally unique, with a number that is incremented each time a new call is made.

The exact response of the CCL to the share request will vary according to the current status and physical configuration of the network. In some cases, such as when X and Y are connected by an ISDN line, it is normally necessary to explicitly set up a call from node X to node Y. Sometimes the new call can be multiplexed onto an existing link, but depending on class of service, this may not always be possible. Of course, the CCL may not know full details of the route from X to Y, but only know the first staging post (messaging and routing are very well understood in the art). Irrespective of the exact procedure used, the result is that a share request is sent from node X to node Y. The Call Manager at Y can then decide whether or not to accept the share, and if so respond accordingly to the Call Manager at X. Assuming that the response is positive, the Call Managers at nodes X and Y are now in a sharing set together.

Extending a call from a two-way call to a multi-party call is a logical extension of the above process. For example, suppose X and Y are already in a call, X01, and Y wants to add in node Z. This can be achieved by the Call Manager at Y issuing the following request;

share_app(Y, NULL, Z, NULL, "X01", NULL)

This results in a share request being sent from Y to Z as described for a two-party call, with Z then having the ability to accept or decline the call. Assuming the latter, then Z sends a share_confirm message back to Y, who then forwards this message onto all the other nodes in the sharing set "X01". In this way the other nodes learn about the addition of a new member to the sharing set. These nodes, in turn, send a share_confirm message to node Z, thereby informing Z of the other nodes in the sharing set. This sequence of messages ensures that no confusion arises even if nodes are added simultaneously to different nodes within the same sharing set.

A slightly different process is required if a party outside a call, Z, wishes to join an existing call, X01, between parties X and Y, on its own initiative. In this case an application at Z (e.g. the Call Manager) sends the following command to the CCL:

share_app(Z, NULL, Y, NULL, NULL, NULL)

which results in the CCL sending a share request to node Y. This is received by the Call Manager at Y since no application is explicitly specified. Because the call id field is also null, there are two possible courses of action for the Call Manager to adopt: it can either treat the message as a request to start a new call, or as a request to join an existing call. Typically the Call Manager will refer this choice to the user to select which option to follow. The first option leads to the establishment of a new call (say "Y01"), whilst the second leads to the inclusion of Z in call id X01, which now involves all three nodes X, Y, and Z.

It is possible to help the decision at Y by using the facility to incorporate user information into a share request. Thus Z could make the following call to the CCL:

share_app(Z, NULL, Y, NULL, NULL, "JOIN X01")

When this gets sent to Y, the Call Manager can interpret this as a request from Z to join into call X01 (as opposed to setting up a new call). Of course in order for this approach to be possible, Z must have a knowledge of call X01; this might be obtained for example if call X01 represented a pre-arranged fixture.

If a node, Z, wishes to leave a call, the Call Manager passes the following unshare command to the CCL:

unshare_app(Z, NULL, "X01", NULL)

which indicates that the Call Manager at node Z is to be removed from the sharing set having the id "X01" (again, "NULL" is used in place of an application name to indicate tile Call Manager). The CCL then sends appropriate notification to the other applications in the sharing set "X01". Note that the unshare command can only be issued by an application at the node to be disconnected, so that it is not possible to remotely drop a third party from a call.

Using the basic mechanisms described above, it is now possible to develop more sophisticated procedures to handle complex call operations. Considering first call merging, it is assumed for the time being that call id's are generated as described above, i.e. by taking the node name as the root, and adding a number which is incremented for each call originated by that node. This ensures that the call id will be unique across the network, so that if two calls are to be merged, they will initially have different call id's (this depends, in turn, of course, on the ability to provide each node with a unique identifier: there are many ways of doing this, such as incorporating the identifier into each copy of the software, or each machine unit, or having some form of registration procedure).

Since there is no facility for changing the name of a sharing set, an alternative process must be employed in order to merge two calls together. This can be achieved by having a node that is a participant in both calls, X say, invite each member of the two existing calls to join a third call (if there is no common member, this can be arranged by using the call joining procedure described above). The user information parameter can then be used to indicate that the new call is a merger of the previous two calls. Thus assuming X is currently in calls Y02 and Z03, it issues the following command to the CCL:

share_app(X, NULL, Y, NULL, "X02", "MERGE Y02 Z03")

Analogous commands can be provided for all the other nodes in the calls Y02 and Z03. These other nodes such as Y can then interpret the user information as an instruction to unshare from call Y02 and Z03 once they have joined the new call X02. Note that even if their Call Managers do not recognize this aspect of the user information, the only result will be that they fail to leave the old call—they will still respond to the share to join the new merged call. It should also be appreciated that since it is not possible to issue a remote "unshare" on behalf of another node, the user information string is the only available mechanism for instructing (or requesting) other nodes to leave a specified call.

Figure 4:
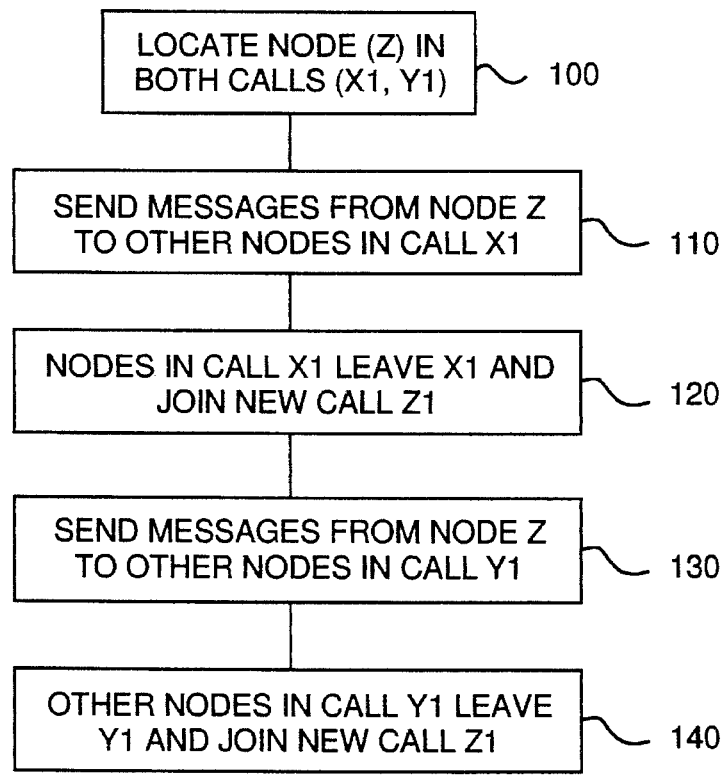
FIG. 4 is a simplified flow chart of the procedure for merging two calls together.

This procedure is illustrated by the flow chart of FIG. 4: a node Z is located which is in both calls (X1 and Y1) (step 100). If no such common node already exists, then it is normally necessary for a node from one call to join the other call in order to produce such a common node. The common node then sends out messages to all the nodes in call X1 to leave this call and join a new call Z1 (step 110). Note that the name of the new call has been generated using the convention discussed above, by appending a number to the name or id of the node setting up the call. In this way, the call can be guaranteed to have a unique name (it is assumed that each node maintains a record of the calls that it has initiated, and so will not use the same number twice). On receipt of these messages the nodes in call X1 act accordingly (step 120). An analogous process occurs for the nodes in call Y1; node Z sends out messages instructing them to leave this call and join new call Z1 (step 130), and the nodes act accordingly on receipt of the message (step 140). Note that steps 110 and 120 may occur in parallel with steps 130 and 140 i.e. the nodes in both calls may be processed simultaneously.

If it is desired to split a call into two, then again this must be accomplished by using the share and unshare commands described above. One node must take responsibility for initiating the split. This node then sends a series of share calls to all the nodes that are to be part of the second (split call). Thus, if a node Y, for example wants to split off from existing call X02, and start a new call Y01, it achieves this by issuing the following command to the CC1, share_app(Y, NULL, Z, NULL, "Y01", SPLIT X02")

This results in a share message being sent to node Z to join the new call "Y01". Analogous messages are sent to all the other nodes that are to be included in the new split call. Furthermore, these nodes interpret the user information "SPLIT X02" as an indication that at the same time as joining the new call Y01, they should also issue an unshare command to disconnect themselves from the call X02.

Figure 5:
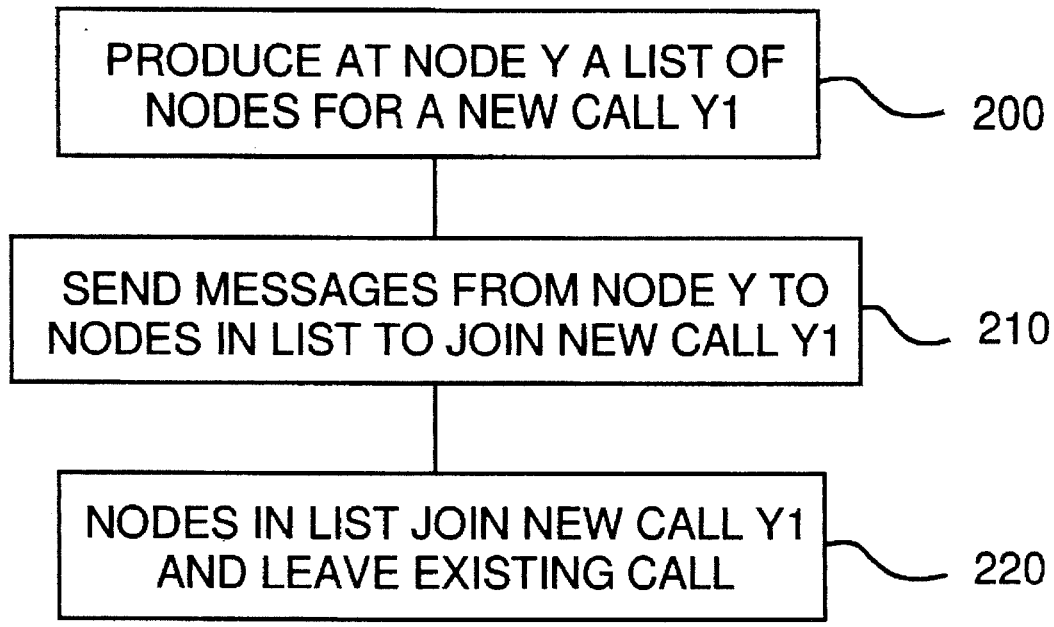
FIG. 5 is a simplified flow chart of the procedure for splitting a single call into two separate calls.

This procedure is illustrated by the flow chart of FIG. 5. Node Y, which is in an existing call, produces a list of nodes, currently in the existing call, which are to be split off into a new call Y1 (step 200). Generally Y will wish to be included itself in call Y1. Node Y then sends messages to all the nodes in the list to join the new call Y1, and to leave the existing call (step 210). The nodes that receive such a message act accordingly (step 220), resulting in a new call containing a break-away subset of the original call, which now only contains the remainder of nodes (ie those nodes which have not joined new call Y1).

We claim:

1. A method of splitting an initial call that exists across an initial set of nodes into first and second calls across first and second disjoint subsets of the initial set, each node comprising a computer workstation in a computer network and including means responsive to messages from other computers in said network to join or leave a call, and each node maintaining a list of calls in which that node is participating, an entry in the list for a call including the identities of all the other nodes in that call, the method comprising the steps of:

producing at one node in said initial set a list of said first subset of nodes to be included in said first call, whereby said second call is to be between nodes in the initial set for but in said first subset;

said one node sending a message to each node in said first subset of nodes including instructions to leave said initial call and join said first call; and each node upon receipt of said message performing the necessary actions to leave said initial call and join said first call.

2. A method of splitting a call as claimed in claim 1, wherein a node cannot be remotely compelled to leave a call, but wherein nodes are responsive to requests from other nodes to perform such an action.

3. A method of splitting a call as claimed in claim 1, wherein each call has a name, and no node may participate in two calls having the same name, the method further comprising the steps of producing at said one node a name for said first call, and including the name for said first call in the messages sent to each node of said first subset.

4. A method of splitting a call as claimed in claim 3, further comprising the step of including the name of the initial call in the messages sent to each node in said first subset.

5. A method of splitting a call as claimed in claim 3, wherein a node cannot be remotely compelled to leave a call, but wherein nodes are responsive to requests from other nodes to perform such an action.

6. A method of splitting a call as claimed in claim 4, wherein a node cannot be remotely compelled to leave a call, but wherein nodes are responsive to requests from other nodes to perform such an action.

7. A method of splitting a call as claimed in any preceding claim, wherein as each node of said first subset receives said message from said one node, it sends back a confirmation message to said one node, which then forwards the message to the other nodes that have so far joined said subset.

8. A method of splitting a call as claimed in claim 7, wherein a node cannot be remotely compelled to leave a call, but wherein nodes are responsive to requests from other nodes to perform such an action.

9. A method of merging first and second calls that exist across first and second initial sets of nodes into a single call across a superset of said first and second initial sets, each node comprising a computer workstation in a computer network and including means responsive to messages from other computers in said network to join or leave a call, and each node maintaining a list of calls in which that node is participating, an entry in the list for a call including the identities of all the other nodes in that call, the method comprising the steps of:

one node sending a message to each node in said first initial set of nodes including instructions to leave said first call and join said single call;

said one node sending a message to each node in said second initial set of nodes including instructions to leave said second call and join said single call; and each node upon receipt of said message performing the necessary actions to leave the first or second initial call as appropriate and join the single call.

10. A method of merging a call as claimed in claim 9, wherein each call has a name, and no node may participate in two calls having the same name, said method further comprising the steps of producing at said one node a name for said single call, and including the name for said single call in the messages sent to each node in said first and second sets.

11. A method of merging a call as claimed in claim 9 further comprising the initial step of selecting said one node, and if the selected node is not already included in both the first and second calls, adding said one node to the first or second call as appropriate.

12. A method of merging a call as claimed in claim 11 further comprising the initial step of selecting said one node, and if the selected node is not already included in both the first and second calls, adding said one node to the first or second call as appropriate.

13. A method of merging a call as claimed in claim 10 further comprising the step of including the name of the first call in the message sent to each node in said first set, and the name of the second call in the message sent to each node in said second set.

14. A method of merging a call as claimed in claim 10 further comprising the initial step of selecting said one node, and if the selected node is not already included in both the first and second calls, adding said one node to the first or second call as appropriate.

15. A method of merging a call as claimed in claim 14 further comprising the initial step of selecting said one node, and if the selected node is not already included in both the first and second calls, adding said one node to the first or second call as appropriate.

16. A method of merging a call as claimed in claim 13 further comprising the initial step of selecting said one node, and if the selected node is not already included in both the first and second calls, adding said one node to the first or second call as appropriate.

17. A method of merging a call as claimed in any of claims 9, 10, 13 or 16, wherein a node cannot be remotely compelled to leave a call, but wherein nodes are responsive to requests from other nodes to perform such an action.

* * * * *